US 6,611,373 B2

(12) United States Patent
Takahashi

(10) Patent No.: US 6,611,373 B2
(45) Date of Patent: Aug. 26, 2003

(54) OPTICAL AMPLIFICATION BLOCK, AND OPTICAL AMPLIFICATION SYSTEM USING THE SAME

(75) Inventor: Tsukasa Takahashi, Sapporo (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/961,295

(22) Filed: Sep. 25, 2001

(65) Prior Publication Data

US 2003/0002144 A1 Jan. 2, 2003

(30) Foreign Application Priority Data

Jun. 27, 2001 (JP) .................................. 2001-194930

(51) Int. Cl.⁷ .............................................. H04B 10/12
(52) U.S. Cl. ................................... 359/341.4; 359/333
(58) Field of Search .......................... 359/341.41, 344, 359/341.42, 341.44, 341.32, 341.1, 341.4, 341.43, 333

(56) References Cited

U.S. PATENT DOCUMENTS

| | | | | |
|---|---|---|---|---|
| 5,239,607 A | * | 8/1993 | da Silva et al. | 359/337.12 |
| 5,537,243 A | * | 7/1996 | Fatehi et al. | 359/341.1 |
| 5,894,362 A | * | 4/1999 | Onaka et al. | 359/110 |
| 5,896,221 A | * | 4/1999 | Saeki | 359/341.2 |
| 5,912,760 A | * | 6/1999 | Sugiya | 359/177 |
| 6,198,571 B1 | * | 3/2001 | Yang | 359/337 |
| 6,219,176 B1 | * | 4/2001 | Terahara | 359/341.1 |
| 6,304,370 B1 | * | 10/2001 | Barnard | 359/341.1 |
| 6,317,255 B1 | * | 11/2001 | Fatehi et al. | 359/177 |
| 6,320,693 B1 | * | 11/2001 | Cereo et al. | 359/132 |
| 6,341,032 B1 | * | 1/2002 | Fukashiro et al. | 359/337 |
| 6,356,385 B1 | * | 3/2002 | Digonnet et al. | 359/337 |
| 6,498,799 B1 | * | 12/2002 | Shevy et al. | 372/6 |
| 2001/0024318 A1 | * | 9/2001 | Atieh | 359/341.1 |
| 2001/0050806 A1 | * | 12/2001 | Sasaki | 359/341.43 |
| 2002/0135867 A1 | * | 9/2002 | Jackel | 359/337 |

FOREIGN PATENT DOCUMENTS

| | | | | |
|---|---|---|---|---|
| JP | 03156429 A | * | 7/1991 | ............ G02F/1/35 |
| JP | 08-037497 | | 2/1996 | |

OTHER PUBLICATIONS

Yoon et al. IEEE Photonics Tech. Letts, vol. 12, No. 10, Oct. 2000.*
Zhou et al. Cleo '01. May 6–11, 2001.*
Zhou et al. OFC 2001, vol. 3, Mar. 17–22, 2001.*
Richards et al. IEEE J. of Selected Topics in Q. Elect., vol. 3 No. 4, Aug. 1997.*
Karasek et al. IEE Proc.–Optoelectron., vol. 147, No. 5, Oct. 2000.*

* cited by examiner

Primary Examiner—Thomas G. Black
Assistant Examiner—Stephen Cunningham
(74) Attorney, Agent, or Firm—Staas & Halsey LLP

(57) ABSTRACT

An optical amplification block is disclosed, which makes possible the shared use of an optical receiver element so that the configuration of one optical receiver element and of a driving circuit for driving the one optical receiver element to be reduced. The optical amplification block includes an optical amplification media for making an optical amplification; a first branching device to input signal lights and branch the signal lights into first branched lights and second branched lights, in a predetermined proportion, and input the first branched lights to the optical amplification media; and a second branching device to input the output of the optical amplification media and the second branched lights, the second branching device branching the input lights into third branched lights as optical amplified output and fourth branched lights as monitor lights.

13 Claims, 14 Drawing Sheets

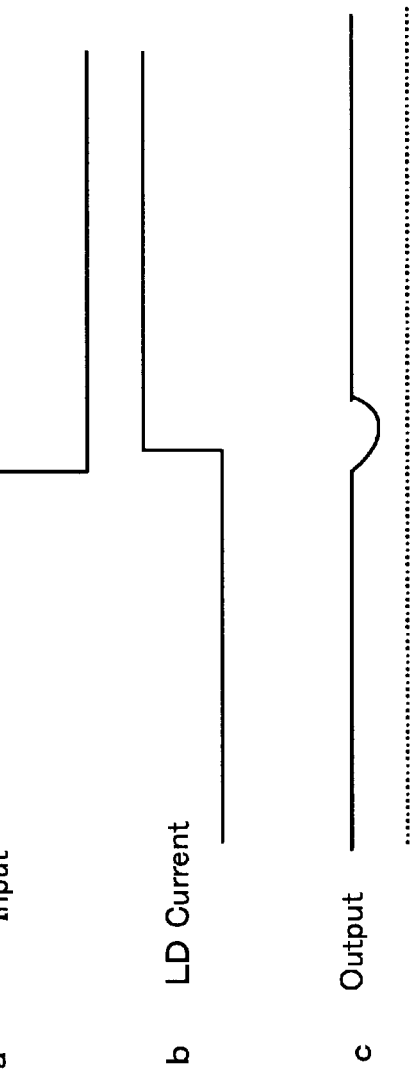
FIG. 12A (Time constant; small)
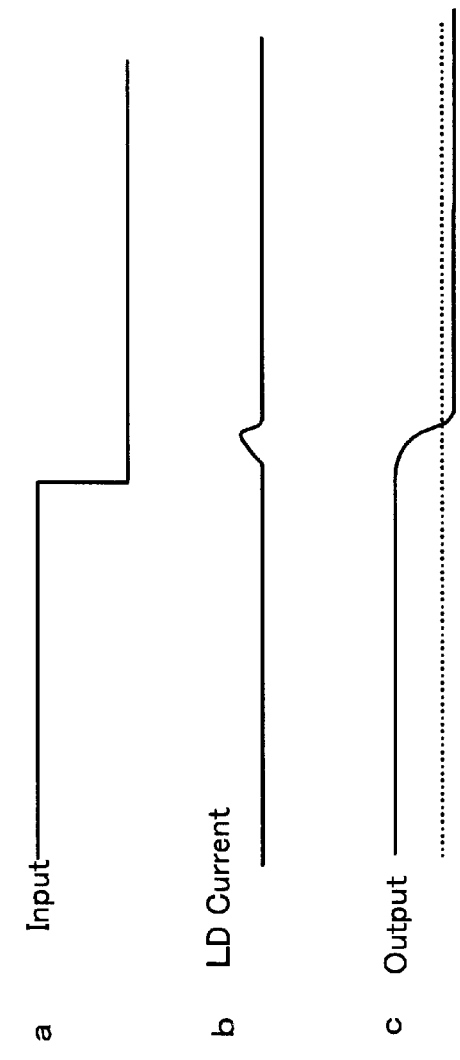
FIG. 12B (Time constant; large)

OPTICAL AMPLIFICATION BLOCK, AND OPTICAL AMPLIFICATION SYSTEM USING THE SAME

BACKGROUND OF THE INVENTION

1. Field of the Invention

The present invention relates to an optical amplification block having an optical amplification fiber or other optical amplifiers and to an optical amplification system using the optical amplification block.

2. Description of the Related Arts

In the optical communication, an optical amplification fiber consisting of an optical fiber of an optical waveguide structure doped with rare earth elements, such as an EDF (erbium doped fiber) (hereinafter referred to as "doped fiber"), or an optical amplification system using a semiconductor optical amplifier consisting of a semiconductor laser is widely being used. The amplifying principle of an amplification fiber on such an optical amplification system is as described below. For the wavelength (for instance, 1.55 um band) of a signal light to be amplified, an excitation light of a specified wavelength (a wavelength which is 100 nm smaller than the wavelength of a signal light: 0.98 um or 1.4 um is selected) will be waveguided into a doped fiber. Under this condition, when a signal light is supplied, the dope element in a doped fiber (in the example shown above, Er: erbium) will be excited by the excitation light and an induced emission will be generated. As a result, signal lights will be amplified.

Here, on the optical amplification fiber of the structure as described above, if excitation is continued by an excitation light, when signal lights will not be supplied (when input is OFF), an optical surge of large power will be outputted, when input is resumed, and optical elements (parts) in the rear can be damaged or deteriorated.

Also, when the semiconductor optical amplifier is used, in order to obtain an output power which meets to an input light, a bias injection current is applied to the adjacent of a threshold of a semiconductor laser. And in order to keep the level of the output power constant, the bias injection current is controlled.

For the reason, if any signal light is not inputted (when the input is OFF), large bias injection current will be supplied. By this, when input is resumed, an optical surge of large power will be outputted.

Therefore, on conventional optical amplification systems, in order to judge the presence or absence of an optical input signal, part of the optical input signals is branched off by a coupler (branching device), and a level of the input light is monitored by a photodiode (PD) or other optical receiver element. When the optical input signal is down or OFF and the detected level of the optical signal becomes lower than the set value, excitation to the doped fiber is controlled to OFF (the supply of excitation light is stopped).

Also, when an auto control (ALC, AGC, etc.) to keep the output of the optical amplification fiber (or the semiconductor optical amplifier) constant, the coupler (branching device) is inserted to the output side of the doped fiber (or the semiconductor) to branch off part of the output. And, the branched part of the output lights is converted into electrical signals by the photodiode (PD) or other optical receiver element, while excitation lights (bias current) is controlled to bring the level to the set level.

Therefore, conventional optical amplification systems needed an optical receiver element to judge the presence or absence of an optical input signal, and an optical receiver element to control an optical output, and in addition, for these optical receiver elements, such an arrangement was needed so that couplers (branching devices) to branch and input an optical input signal and optical output signal would be used in pairs.

SUMMARY OF THE INVENTION

In view of the conventional configuration, the object of the present invention is to provide an optical amplification block that makes possible the shared use of an optical receiver element to judge the presence or absence of optical input signals and an optical receiver element to control an optical output, to thereby allow the configuration of one optical receiver element and of a driving circuit for driving the one optical receiver element to be reduced, and an optical amplification system using the amplification block.

In order to achieve the above object, according to a first aspect of the present invention there is provided an optical amplification block comprising an optical amplification media for making an optical amplification; a first branching device to input signal lights and branch the signal lights into first branched lights and second branched lights, in a predetermined proportion, and input the first branched lights to the optical amplification media; and a second branching device to input the output of the optical amplification media and the second branched lights, the second branching device branching the input lights into third branched lights as optical amplified output and fourth branched lights as monitor lights.

In order to achieve the above object, according to a second aspect of the present invention there is provided an optical amplification block comprising an optical amplification media for making an optical amplification; a first branching device to input signal lights and feedback branched lights and branch the input lights into first branched lights and second branched lights as monitor lights, in the specified proportions, the first branching device inputting the first branched lights to the optical amplification media; and a second branching device to input the output of the optical amplification media and branch the input lights into third branched lights as optical amplified outputs and fourth branched lights as feedback branched lights, in a predetermined proportion.

Preferably, the optical amplification block may further comprise removal means to remove ASE contained in optical signals amplified by the optical amplification media from the monitor lights.

The optical amplification media may be an optical amplification fiber to change the optical output level by excitation lights supplied, and the emission of the excitation lights supplied may be controlled depending on the level of the monitor lights.

The optical amplification media may be a semiconductor optical amplifier to change the optical output level by an input bias current, and the supply of the input bias current may be controlled depending on the level of the monitor lights.

In order to attain the above object, according to a third aspect of the present invention there is provided an optical amplification system comprising the amplification block; and an optical amplification control unit which inputs an optical signal level detected in conformity with the monitor lights in the amplification block, to compare the optical signal level with a first reference potential, the optical amplification control unit, when the optical signal level becomes lower than the first reference potential, stopping the emission of the excitation lights and comparing the optical signal level with a second reference signal to control the magnitude of the power of the excitation light depending on the magnitude of the difference from the second reference signal.

In order to attain the above object, according to a fourth aspect of the present invention there is provided an optical amplification system comprising the amplification block; and an optical amplification control unit which inputs the optical signal level detected in conformity with the monitor lights in the amplification block, to compare the optical signal level with a first reference potential to thereby control the magnitude of the excitation light depending on the magnitude of the difference from the first reference potential, the optical amplification control unit providing a control such that emission of the excitation light is stopped or permitted when the fall and the rise of the optical signal level to be detected in conformity with the monitor lights becomes lower than or higher than a predetermined potential.

The optical amplification control unit preferably includes a differentiation circuit to generate pulses for the fall and rise of the optical signal level to be detected.

The optical amplification control unit preferably includes a time constant circuit to compare the optical signal level with the first reference potential to delay the timing of detection at which the optical signal level becomes lower than the first reference potential.

BRIEF DESCRIPTION OF THE DRAWINGS

The above and other objects, aspects, features and advantages of the present invention will become more apparent from the following detailed description when taken in conjunction with the accompanying drawings, in which:

FIGS. 12A & 12B show the relation between the input lights and the output timing of a laser diode 2 for excitation lights;

DESCRIPTION OF THE PREFERRED EMBODIMENTS

Preferred embodiments of the present invention will now be described with reference to the drawings. To facilitate the understanding of the present invention, the conventional example of configuration is described in advance.

Figure 1:
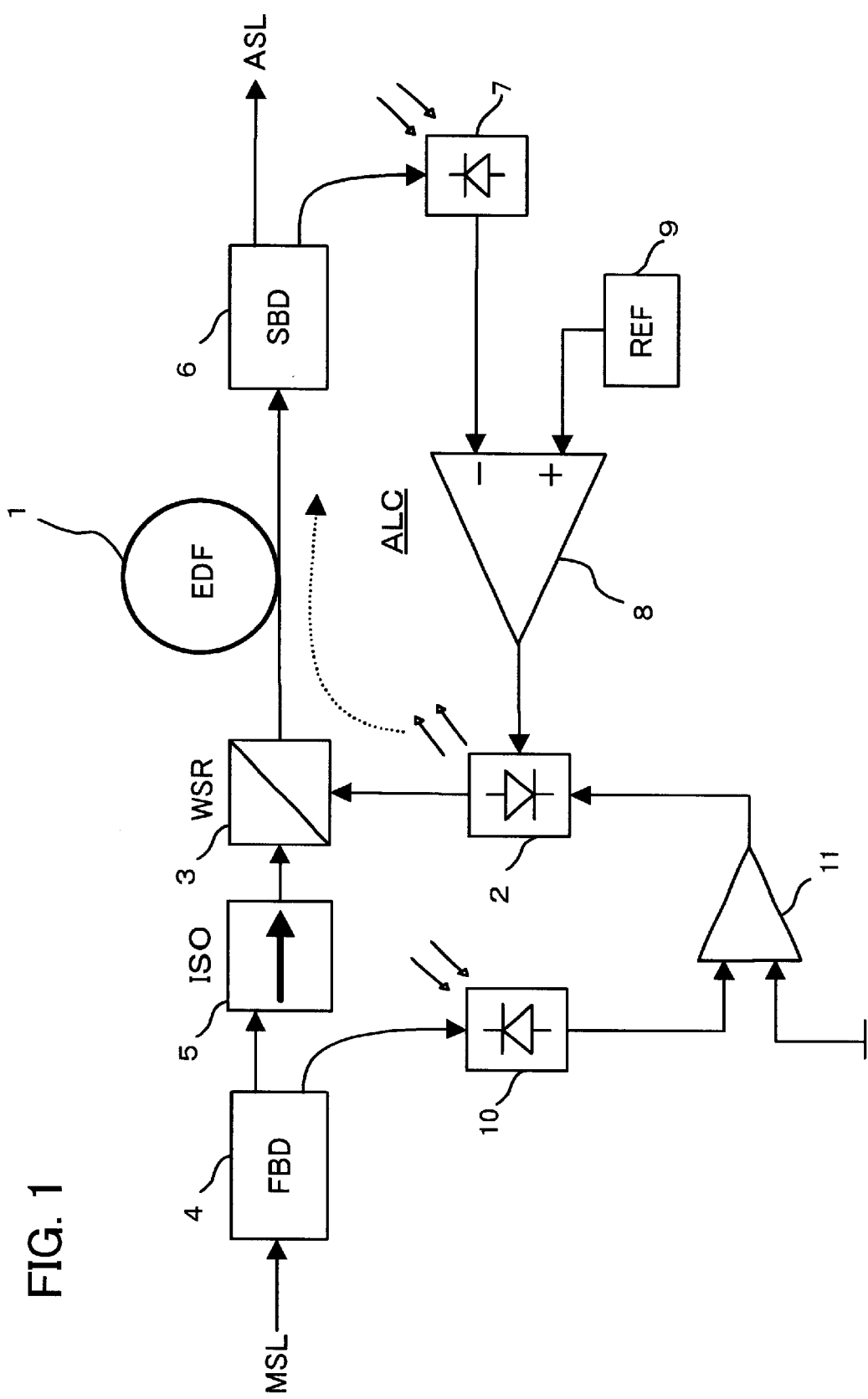
FIG. 1 is a block diagram for conventional configuration of an optical amplification system.

FIG. 1 shows a block diagram for an embodiment of the conventional optical amplification system. A doped fiber 1 constructing an optical amplification fiber is an optical amplification fiber doped with eribium (Er), one of rare earth elements (EDFA).

To the doped fiber 1, excitation lights that are emitted and outputted by a laser diode 2 for excitation lights will be supplied through a wave synthesizer (WSR)3. While, signal lights will be inputted to the first branching device (FBD)4, and further inputted to the wave synthesizer 3, and then synthesized with the excitation light and inputted to the doped fiber 1. Therefore, the main signal light input will be optically amplified by the doped fiber 1 and outputted through the second branching device (SBD)6.

Here, the optically amplified main signal lights will be partially branched by the second branching device 6, and inputted to an optical receiver element 7 as monitor lights. Then, the branched and outputted lights from the branching device 6 will be converted into appropriate electrical signals by an optical receiver element 7.

The converted electrical signals will be compared with the established comparative electric potential 9 by a comparator 8. The bias electric potential of the laser diode 2 for excitation light will be controlled according to the magnitude of the difference from the comparative electric potential from the comparator 8, which means the magnitude of the emitted output will be controlled by the laser diode 2 for excitation light. By this, the output level of the optically amplified main signal lights (ASL) will be controlled to keep it constant. (ALC: Automatic Level Control).

On the other hand, at the first branching device 4, the main signal lights will be partially separated and inputted to the second optical receiver element 10. At the optical receiver element 10, electrical signals matching to the magnitude of the received main signals will be outputted. Accordingly, the voltage corresponding to the main signal lights received by the optical receiver element 10 will be compared with the established reference value at a comparator 11, and if the value does not reach the reference value, a control signal will be outputted to stop emitting of the laser diode 2 for excitation light.

By this operation, when main signal lights are not entered, the laser diode 2 for excitation light will continue emitting, and at the time when the entry of main signal lights resumes, an optical surge of a large power will be outputted, thereby enabling optical elements (component parts) in the rear to avoid possible damages or deteriorations.

However, in the configuration shown in FIG. 1, two optical receiver elements, as the first optical receiver element 7 to detect the level of the main signals that was amplified because of the ALC and the second optical receiver element 10 to detect the presence or absence of the input of the main signals, as well as a circuit to control these will be needed.

Therefore, for optical amplification systems, the present invention is to provide an optical amplification block that can avoid the need to use two optical receiver elements as described above, and an optical amplification system with the application of it.

Figure 2:
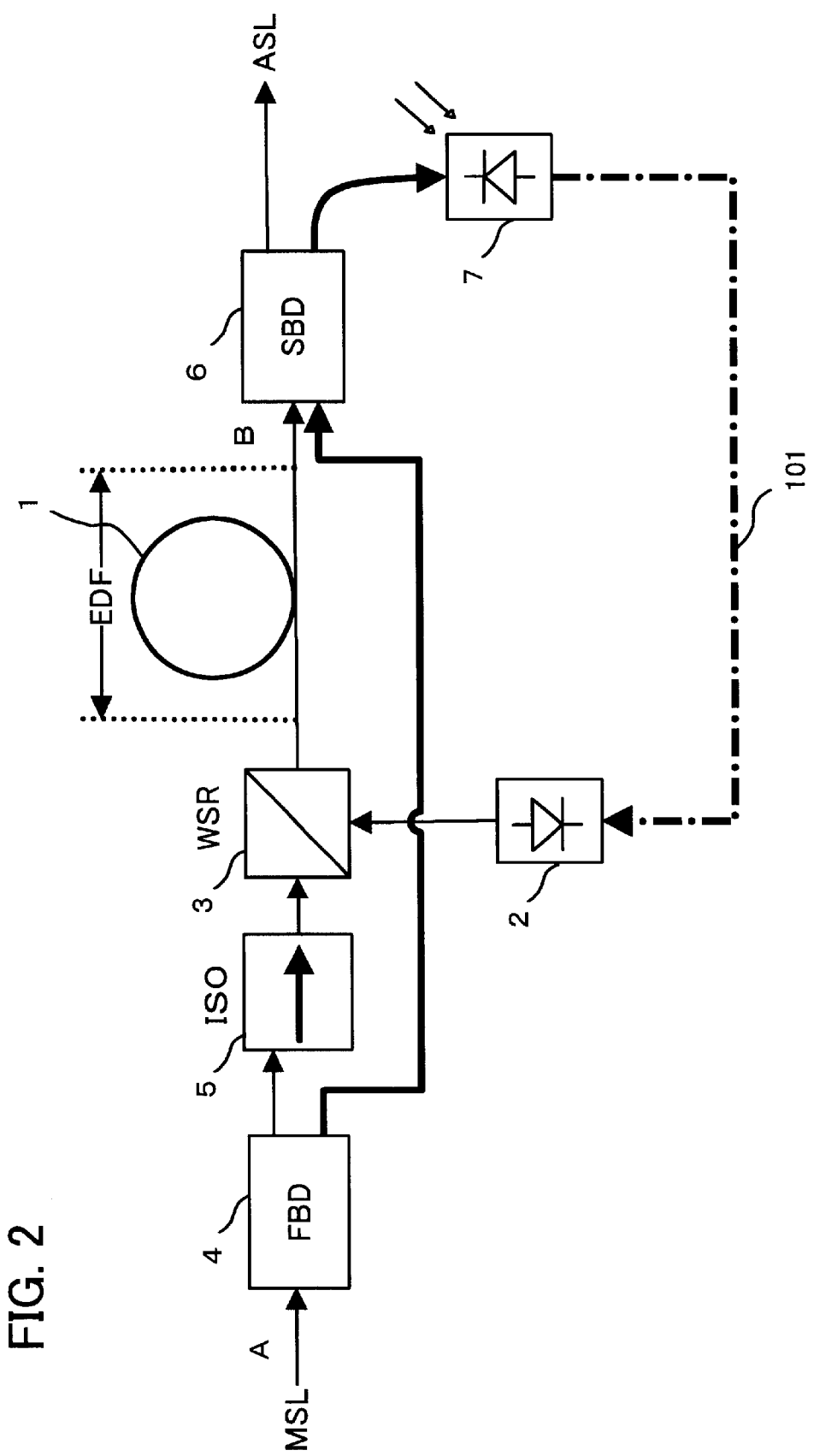
FIG. 2 shows a first principle-based configuration of an optical amplification system under the present invention.

FIG. 2 shows a first principle-based configuration of an optical amplification system under the present invention. Here, if an element shown in FIG. 2 and an element in the system shown in FIG. 1 are the same or similar, the same reference number is used. The same numbering method applies to the following embodiments. A feature shown in FIG. 2, compared with FIG. 1, is the configuration where the main signals to be branched by the first branching device 4 is directly inputted to the second branching device 6. Here, the branching devices 4 and 6 have two input ports and two output ports (2×2), and these branching devices are configured using a fusion attached part formed by fusion attaching a fiber-to-fiber, a dielectric multilayer film or a waveguide.

The power of the main signal lights to be inputted to the first input port of the first branching device 4 will be partially branched in the specified proportions and inputted directly to the second branching device 6. The output to be branched in the specified proportions of the main signal power directly inputted from the first branching device 4 and the amplified output of a doped fiber 1 will be inputted to an optical receiver element 7 as a monitor light.

Here, a supposition is made on a case where the input of optical main signals stopped. At this time, as the output of the first branching device 4 stops, the component of the main signal light to be directly inputted to the second branching device 6 becomes zero. Therefore, at an optical amplifier unit which is only numbered 101 but not noted specifically in FIG. 2, the detection output of the optical receiver element 7, in short, the optical signal level to be detected drops down to less than the specified value, thereby causing the OFF state of the optical main signal input to be detected.

Based on this, the laser diode 2 for excitation light is controlled to stop emitting, thereby preventing the laser diode 2 for excitation light from being driven during the input of the optical main signal is in the OFF state.

Moreover, in the case when the input of the optical main signal resumed, as the output of the doped fiber 1 is zero, the light to be radiated in the optical receiver element 7 is only the component of the optical input signal, thereby facilitating the detection at an optical amplification control unit.

In addition, the ALC compares the output from the second output port of the branching device 6 with the specified value, and controls the bias of the laser diode 2 for excitation light according to the magnitude of the difference. By this operation, the output of an amplifier can be kept constant by control.

Figure 3:
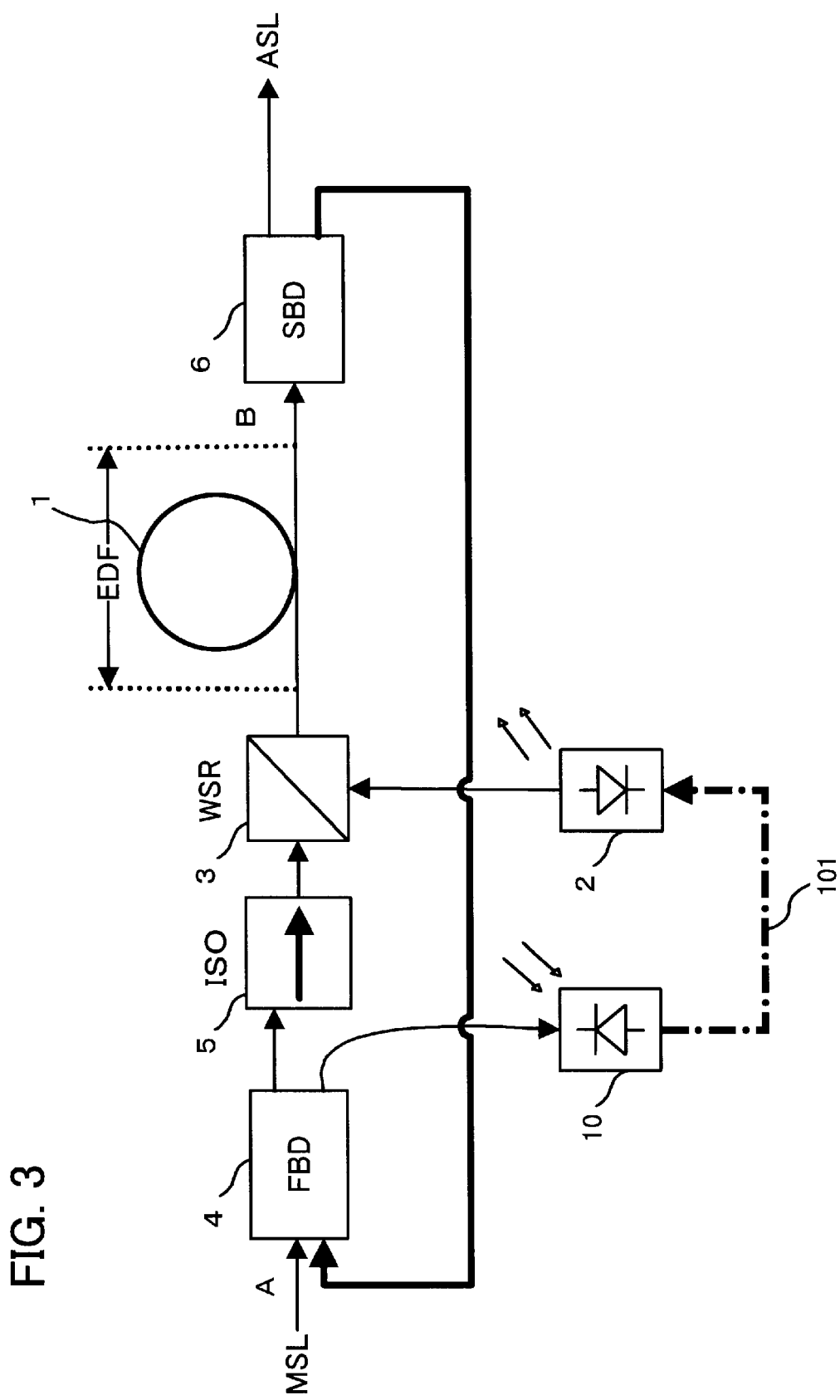
FIG. 3 shows a second principle-based configuration of an optical amplification system under the present invention.

FIG. 3 shows a second principle-based configuration of an optical amplification system under the present invention. In the configuration shown in FIG. 3, the configuration allows signals to be branched in the specified proportions by the second branching device 6 to return to the second input port of the first branching device 4. The signals to be returned to the second input port of the first branching device 4 will be further branched in the specified proportions by the first branching device 4, and inputted to the optical receiver element 10, as a monitor light.

Therefore, assuming that the input of the optical main signal should stop, the monitor light to be branched by the first branching device 4 and inputted to the optical receiver element 10 is the light which is only equivalent to the signals that will branch from the second branching device 6 in the specified proportions and will return to the first branching device 4.

From this reason, at the optical amplification control unit which is only numbered 101 but not specifically noted in FIG. 3, the detection output of the optical receiver element 10, in other words, the optical signal level being lower than the specified value, or the off state of the main signal light input will be detected. From the detection, the laser diode 2 for excitation light will be controlled to stop emitting.

Also, when the input of main signal lights resumes, as the output of the doped fiber 1 is zero, the light to be radiated in the optical receiver element 10 can be easily detected, as it is only equivalent to the specified percentage of the optical input signal.

Moreover, the ALC compares the output from the second output port of the branching device 4 with the specified value, and controls the bias of the laser diode 2 for excitation light according to the magnitude of the difference. By this operation, the output of the amplifier can be controlled to be constant.

As shown in FIGS. 2 and 3, it is possible in the present invention to use the same optical receiver elements for detecting the OFF state of the optical input and for detecting the optical signal level for the ALC.

Figure 4:
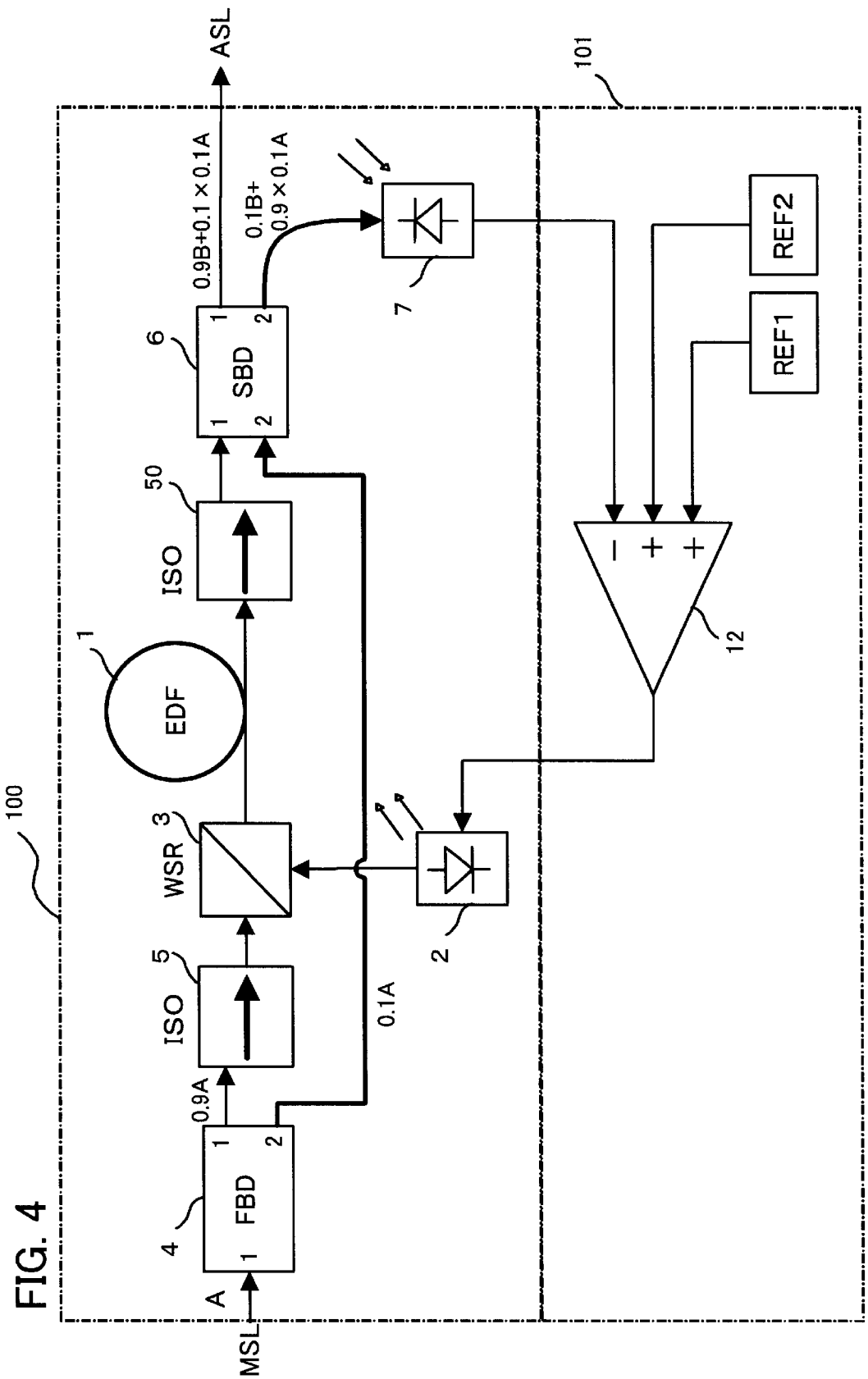
FIG. 4 shows a block diagram for an embodiment of the present invention conforming to the principle-based configuration shown in FIG. 2.

Next, the following shows embodiments of an optical amplification system based on the principle-based configuration. FIG. 4 shows a block diagram for an embodiment of the present invention supporting the principle-based configuration shown in FIG. 2.

In FIG. 4, the first block 100 enclosed with a dotted line is an amplification block consisting of elements as noted in FIG. 2, including an optical amplification fiber made up of a doped fiber 1, the first and the second branching devices 4 and 6, a laser diode 2 for excitation light, and an optical receiver element 7. And, the second block 101 enclosed with a dotted line is an optical amplification control unit as described in FIG. 2.

Here, studies are made on the branching ratio at the branching devices 4 and 6 placed on the amplification block 100. On the supposition that the branching ratio of the first branching device 4 would be (10:90), and the power of the main signal to be inputted to the first input port of the first branching device 4 would be A, the first branching device 4 will output the power of 0.9A to the first output port operatively connected to the doped fiber 1, and output the power of 0.1A to the second output port directly connected to the branching device 6.

As for the second branching device 6, the output B of the doped fiber 1 will input to the first input port, and the branched output from the second output port of the branching device 4 will input to the second input port.

Similarly, the branching ratio of the second branching device 6 is supposed to be (10:90), 0.9B corresponding to the input B of the first input port of the branching device 6 will be outputted from the first output port as the amplified signal lights, together with 0.1A×0.1 for the power 0.1A directly inputted to the second input port. Further, from the second output port of the branching device 6, 0.1B for the input B of the first input port, and 0.1A×0.9 for the input 0.1A of the second input port will be outputted.

Accordingly, from the second output port of the branching device 6, the optical power of 0.1B and 0.09A will be inputted to the optical receiver element 7.

Here, studies are made on the case when the input of optical main signal should stop. At this time, as the output of the first branching device 4 stops, the output 0.09A from the second output port of the second branching device 6 would be zero.

The optical amplification control unit 101 has two reference potentials, REF1 and REF2, and a comparative circuit 12 to input the detection output of the optical receiver element 7 and to control the emission of the laser diode 2 for excitation light.

By the comparative circuit 12, the detection output of the optical receiver element 7 will be compared with the first reference potential REF1 for detecting the OFF state of the optical input signal. If the detection output of the optical receiver element 7 is lower than the specified value, the comparative circuit 12 will detect the OFF state of the optical main signal input, and output the first control signal. By this first control signal, the bias supply of the laser diode 2 for excitation will be suspended, and the laser emission will be stop controlled.

In addition, when the input of optical main signal resumed, as the output of the doped fiber 1 is zero, the light to be radiated in the optical receiver element 7 will be only the component of the optical input signal, (0.1A×0.9), thereby facilitating the detection at the comparative circuit 12. At this time, the output of the first control signal will turn OFF, and the bias will be controlled so that the laser diode 2 for excitation starts emitting.

The ALC compares the output from the second output port of the branching device 6 with the second reference potential REF2, and outputs the bias control signal for the laser diode 2 for excitation light, according to the magnitude of the difference. By this operation, the emission of the laser diode 2 for excitation light will be controlled, and the control by the doped fiber 1 can be made to keep the output of the optical amplification fiber constant.

Figure 5:
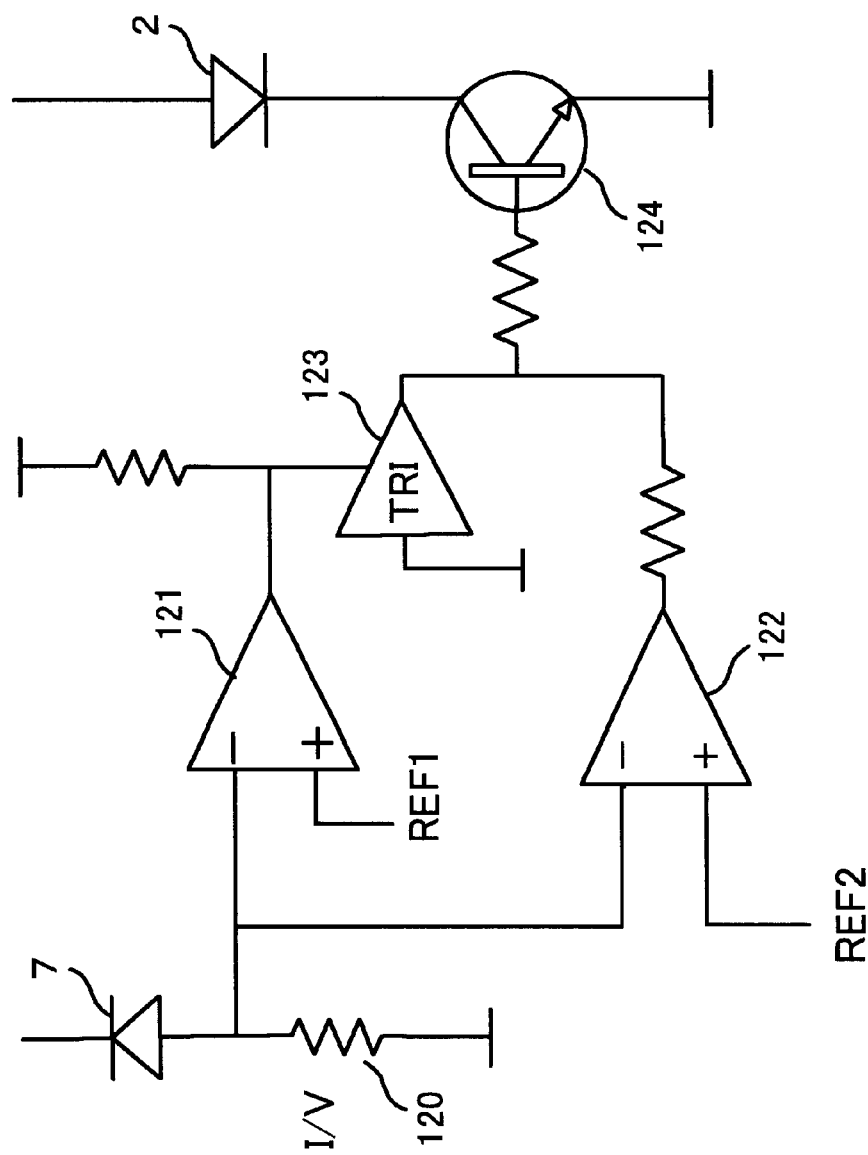
FIG. 5 shows an example of a detailed circuit of a comparative circuit 12.

FIG. 5 shows an example of a detailed circuit of the comparative circuit 12. A resistance 120 is connected to the optical receiver element 7 in series, and converts the amperage corresponding to the magnitude of the optical signal detected by the optical receiver element 7 into the detection amperage.

This amperage is supplied to one of input ends for each of two comparative elements 121 and 122. To the other input end of the comparative element 121, the first reference potential REF1 is supplied, and to the other input end of the comparative element 122, the second reference potential REF2 is supplied. To the output side of the comparative element 121, a trystate inverter 123 is connected, and the output of this trystate inverter 123 is connected to the base of a transistor 124, together with the output of the comparative element 122. The transistor 124 is connected to the laser diode 2 for excitation light in series and controls the magnitude of its bias current.

In such a configuration, when the optical input signal turns OFF and the magnitude of the detection voltage generated to a transistor 120 becomes smaller than the first reference potential REF1, the outputted electrical potential of the comparative element 121 will be inverted, and the trystate inverter 123 will be shifted, so that the base electrical potential of the transistor 124 can be clamped to the non-continuity control electrical potential.

By this operation, the transistor 124 will be OFF, and the bias current of the laser diode 2 for excitation light will be also OFF, thereby allowing the laser diode 2 for excitation light to stop emitting.

On the contrary, while the detected voltage is larger than the reference voltage REF1, the base potential of the transistor 124 will be kept on to the voltage which is at least enough to maintain the transistor in the active state. And by the second comparator element 122, the voltage equivalent to the difference from the second reference potential REF2 will be supplied to the base of the transistor 124. Therefore, the transistor 124 will be able to supply the bias current corresponding to the difference from the second reference potential REF2 to the laser diode 2 for excitation light. By this supply, the output of the doped fiber 1 will be controlled to constant.

Figure 6:
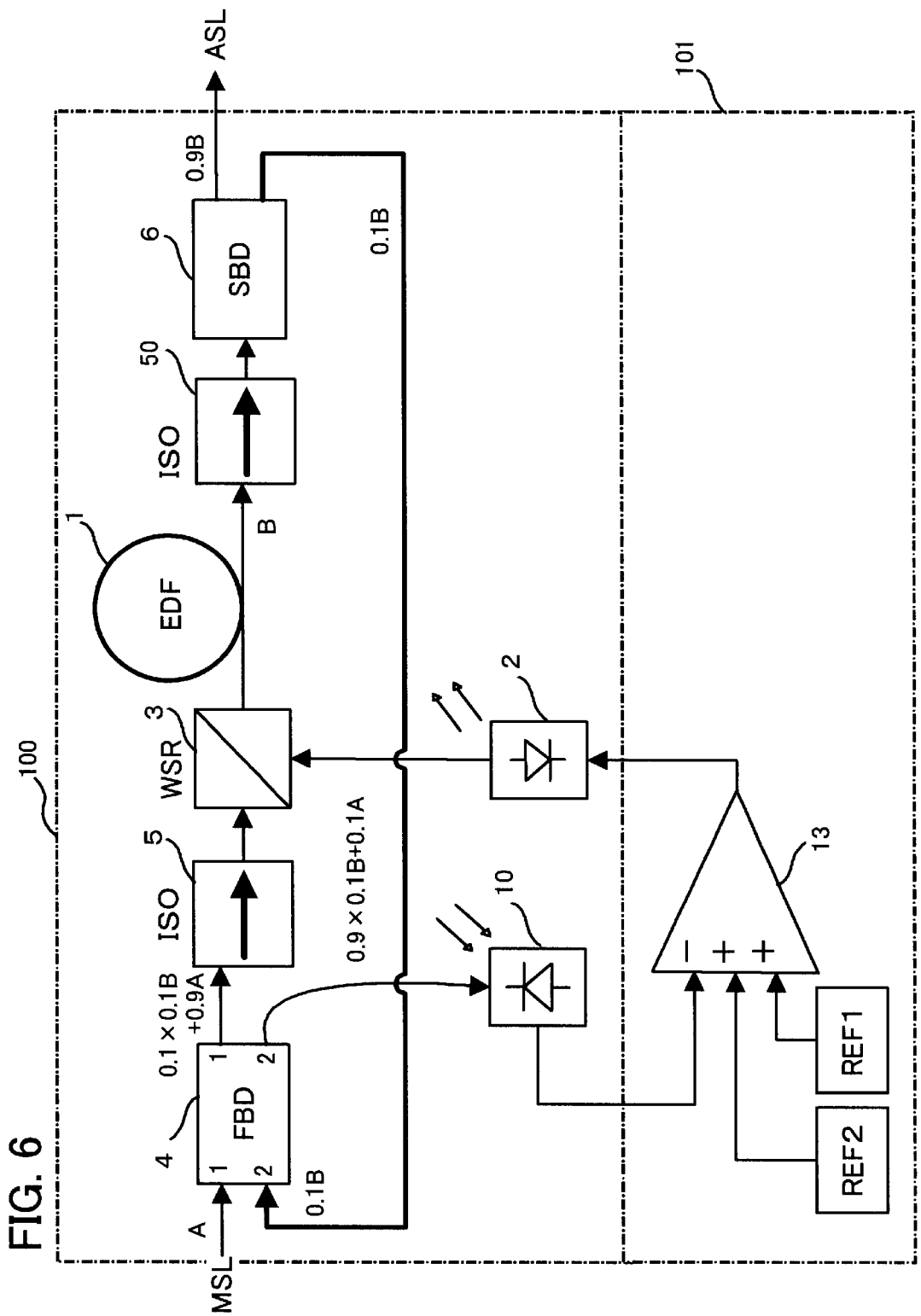
FIG. 6 is a block diagram for an embodiment of the present invention conforming to the principle-based configuration shown in FIG. 3.

FIG. 6 shows a block diagram for an embodiment of the present invention supporting the principle-based configuration shown in FIG. 3.

In FIG. 6, like in the embodiment shown in FIG. 4, the first block 100 enclosed with a dotted line is an amplification block having elements as noted in FIG. 3, and it consists of elements including an amplifier made of a doped fiber, first and second branching device 4 and 6, a laser diode 2 for excitation light, and an optical receiver element 10. Further, the second block 101 enclosed with a dotted line is an optical amplification control unit already described in FIG. 3.

An optical amplification control unit 101 has two reference potentials REF1 and REF2, and a comparative circuit 13 to input the detected output of the optical receiver element 10 and to control the emission of the laser diode 2 for excitation light. The configuration of the comparative circuit 13 is the same as the configuration shown in FIG. 5. Therefore, the reference potential REF1 to be supplied to the comparative circuit 13 is a reference potential to stop/control the emission of the laser diode 2 for excitation light, in accordance with the presence or absence of the major input signal lights, and the reference potential REF2 is a reference potential for controlling the output level of the doped fiber 1 to keep it constant.

In the embodiment shown in FIG. 6, studies are made on the branching ratio at the branching devices 4 and 6 located at the amplifier 100. On the assumption that the branching ratio at the first branching device 4 would be (10:90), and the power of the main signal to be inputted to the first input port of the first branching device 4 would be A, then, the first branching device 4 will output the power of 0.9A to the first output port connected to the side of the doped fiber 1, and to the second output port directly connected to the branching device 6, output the power of 0.1A.

Similarly, on the assumption that the branching ratio of the second branching device 6 would be (10:90), then, 0.9B corresponding to the input B of the first input port of the branching device 6 will be outputted from the first output port as the amplified signal light. In addition, from the second output port of the branching device 6, 0.1B corresponding to the input B of the first input port will be outputted.

The output of 0.1B from the second output port of this branching device 6 will be returned and inputted to the second input port of the first branching device 4, and against 0.1B, the output at the ratio of 0.1 will be outputted to the first output port, and to the second output port, the output at the ratio of 0.9 will be outputted.

Therefore, to the optical receiver element 10, the optical power of 0.1A and 0.1B will be inputted.

Here, studies are made on the case where the input of the optical main signal turned OFF. At this time, the output power 0.1A from the second output port of the first branching device 1 would be zero.

As described above, to the comparative circuit 13 located at the optical amplification control unit 101, two reference potentials, REF1 and REF2, and the detected output of the optical receiver element 10 will be inputted.

By the comparative circuit 13, the detected output of the optical receiver element 10 will be compared with the first reference potential REF1 for detecting the OFF state of the optical input signal. When the optical power 0.1A from the second output port of the first branching device 4 becomes zero, and the detected output of the optical receiver element 10 becomes lower than the specified value, the comparative circuit 13 will detect the OFF state of the optical main signal input and output the first control signal. By the first control signal, the bias supply of the laser diode 2 for excitation will be turned OFF and the laser emission will be controlled to stop.

In addition, when the input of the optical main signal resumed, the optical power to be radiated in the optical receiver element 10 is only the component of the optical input signal (0.1A), because the output of the doped fiber 1 is zero, detection can be made easily at the comparative circuit 13. At this time, the output of the first control signal will turn OFF, and bias will be controlled so that the laser diode 2 for excitation can start emitting.

Moreover, the ALC compares the output from the second output port of the branching device 4 with the second reference potential REF2, and outputs the bias control signal of the laser diode 2 for excitation light according to the magnitude of the difference. By this operation, also in the embodiment shown in FIG. 6, the emission of the laser diode 2 for excitation light is controlled, and the control by the doped fiber 1 can be made to keep the output of the optical amplification fiber constant.

Figure 7:
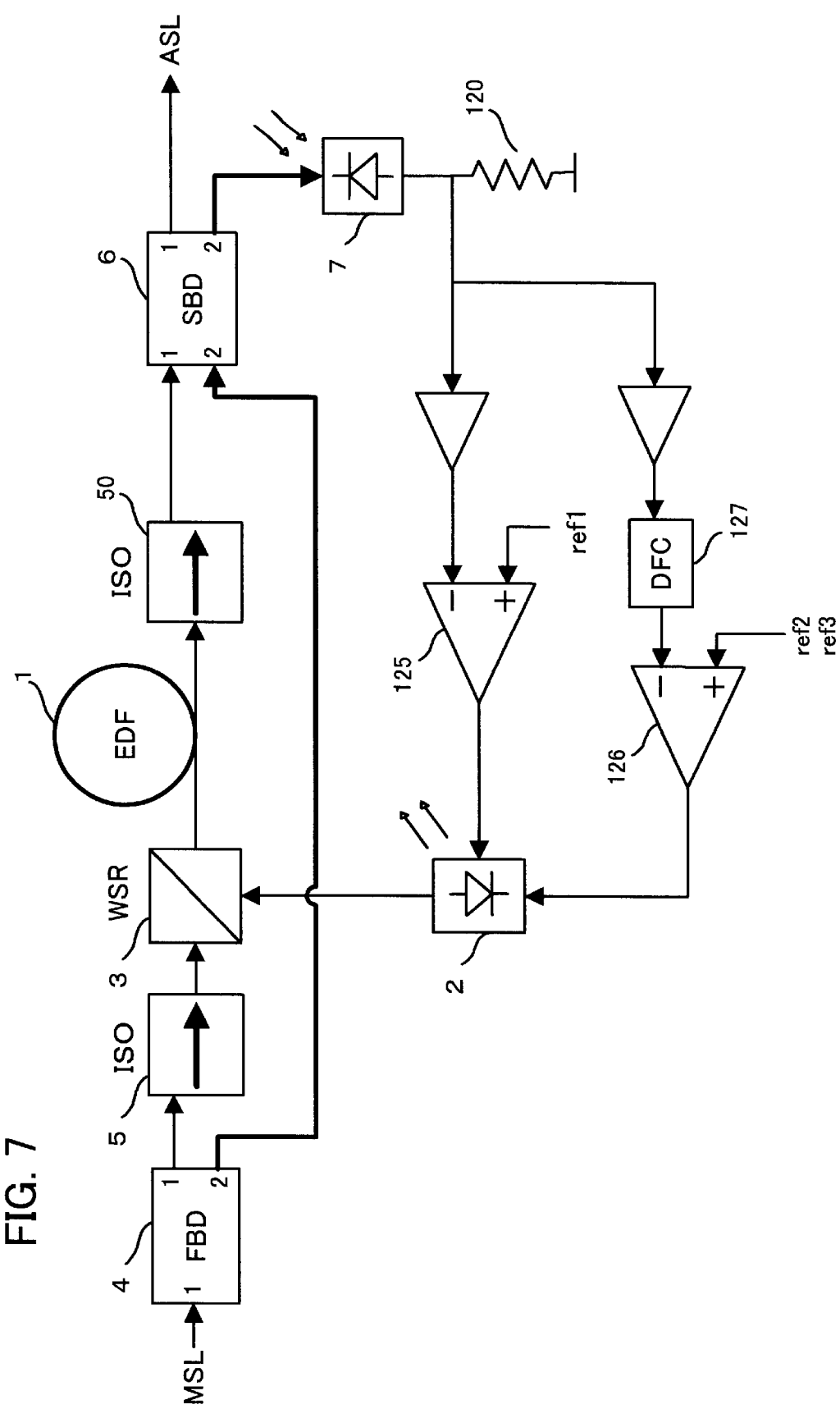
FIG. 7 is a block diagram for embodying an optical amplification system applying another embodied configuration of an optical amplification control unit 101.

FIG. 7 shows a block diagram for an embodiment of an optical amplification system applying another embodied configuration of an optical amplification control unit 101. Here, FIG. 7 shows a configuration in which the optical amplification control unit 101 is replaced, compared with an embodiment shown in FIG. 4, however, such a configuration can also be embodied, in which the optical amplification control unit 101 is replaced, compared with an embodiment shown in FIG. 6.

In FIG. 7, an optical amplification control unit 101 has two comparative circuits 125 and 126.

The comparative circuit 125 compares the reference potential ref1 with the detected electrical potential, in other words, the voltage converted by a resistance 120 from the current detected by an optical receiver element 7. And, it controls the bias current of a laser diode 2 for excitation light, in accordance with the magnitude of the difference outputted from the comparative circuit 125, thereby enabling the amplified output of a doped fiber 1 to be kept constant.

Figure 8:
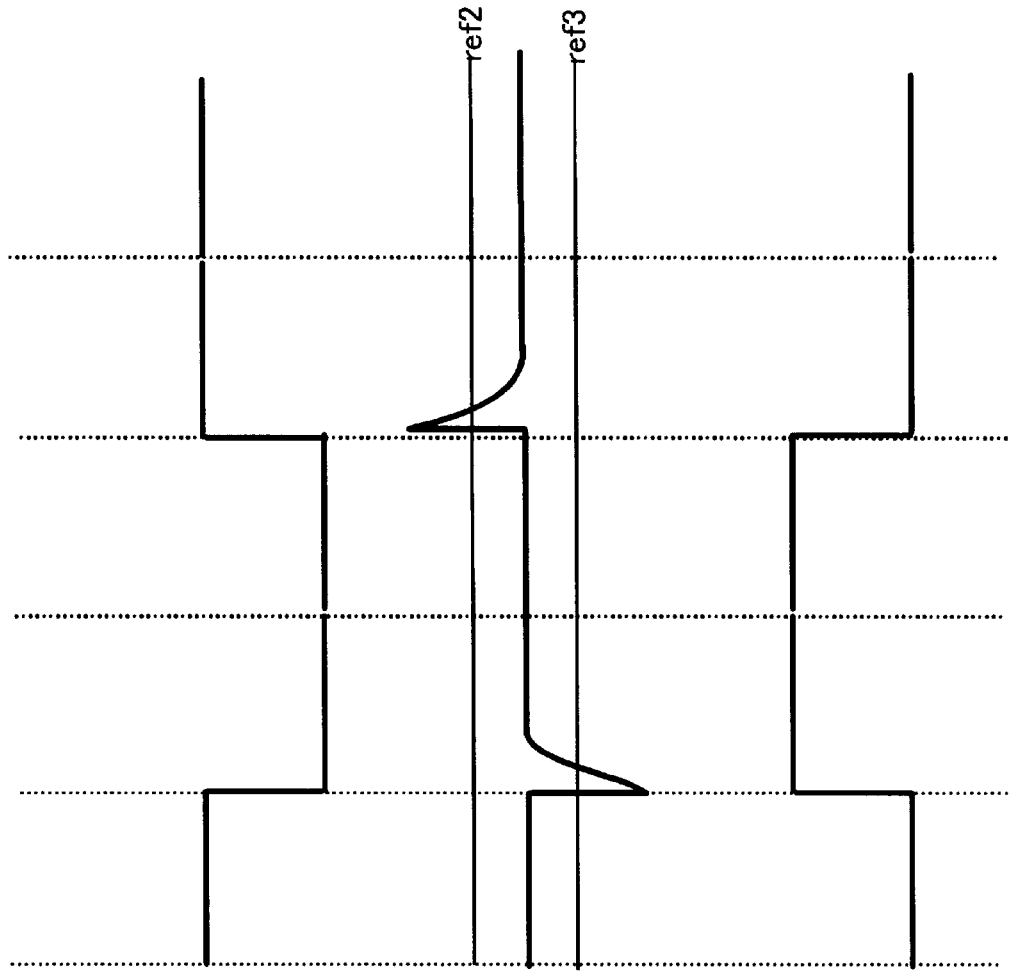
FIG. 8 shows explanations about a method to detect the OFF state of the input of optical main signals.

While the comparative circuit 126 is to control the emission of the laser diode 2 for excitation light, in accordance with the presence or absence of the input of the optical signal. As a feature, by a differentiation circuit (DFC)127, the differentiation value of the detected electrical potential, in other words, the voltage converted by the resistance 120 from the current detected by the optical receiver element 7 will be obtained. At the comparative circuit 126, the obtained differentiation value will be compared with the reference potentials ref2 and ref3. The following shows further detailed explanations about this, from FIG. 8 explaining a method of detecting the OFF state of the input of optical main signals. In FIG. 8, by the OFF state of the input of optical main signals, the waveform (FIG. 8A) will change. Therefore, by a differentiation circuit 127, at the time of the rise and the fall of the waveform in FIG. 8A, a pulse is generated (FIG. 8B).

The comparative circuit 126 compares the magnitude of a pulse at the time of the fall or the rise with the reference potential ref3 or the reference potential ref2, respectively. Therefore, the comparative circuit 126 outputs the pulse duration equivalent to the fall duration or the rise duration of the output of the differentiation circuit 127 (in short, the time during which the input of optical main signal remains in the OFF state) (FIG. 8C).

By the output of the comparative circuit 126, the laser diode 2 for excitation light will be controlled to stop emitting.

Here, in each embodiment as described above, if the ALC control is performed to the optical amplification fiber, when the OFF state of the input of optical main signals should take place, the control will turn ON to the amplification fiber to keep the output constant. In this case, if the amplified signal lights form a large proportion of the output lights, as the output power will significantly go down, the OFF state of the input can be detected without being affected by the ASE (Amplified Spontaneous Emission) light.

Figure 9:
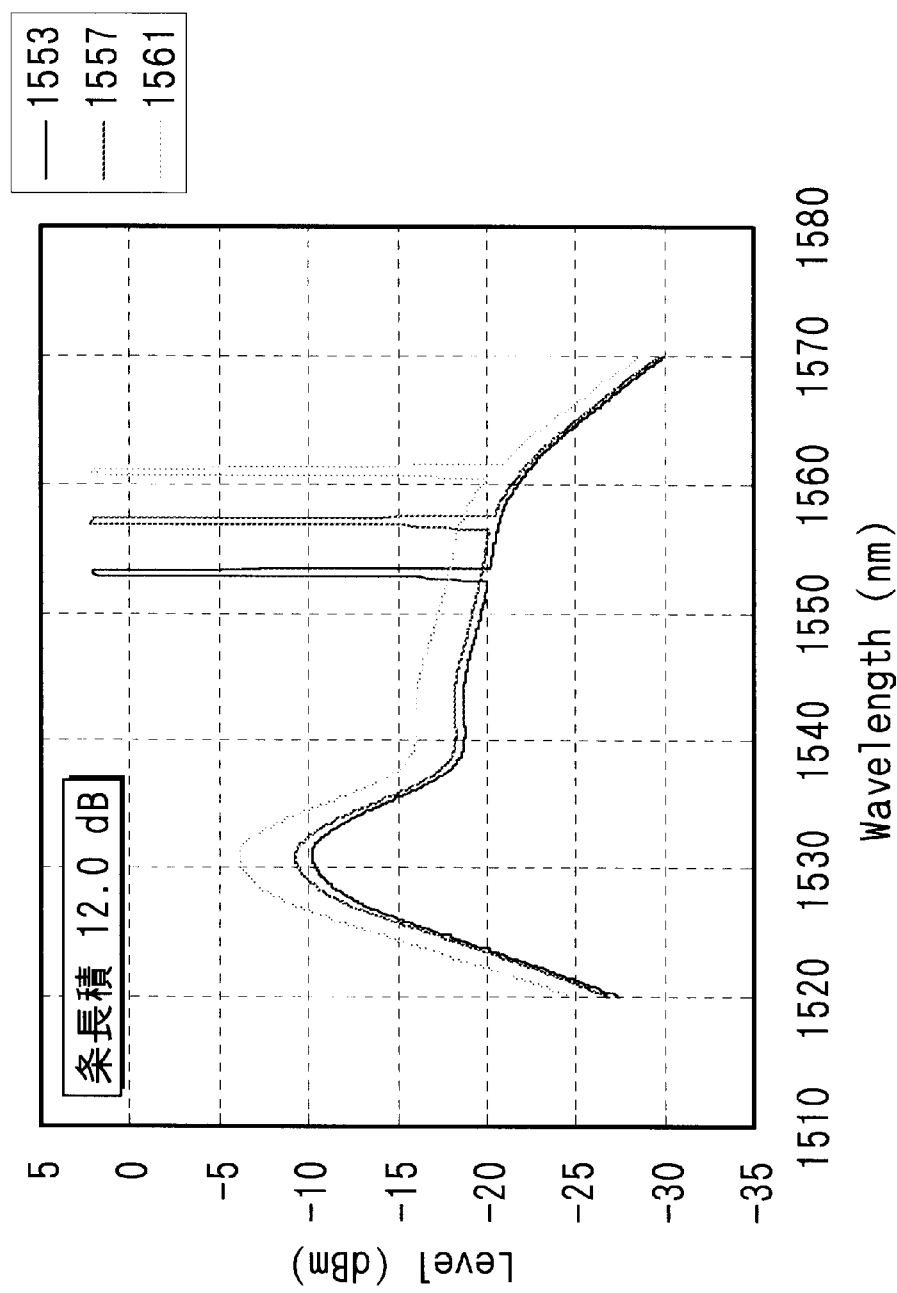
FIG. 9 shows the relation between the amplified signal lights and the ASE lights.

FIG. 9 shows the relation between the amplified signal light and the ASE. Each peak of the amplified signal lights having the wavelengths of 1553, 1557 and 1561 nm is shown as an optical signal light of 1500 nm band. In addition, around these wavelengths, spectra of the ASE lights are shown. Therefore, when the difference between the level of the main signal light and the level of the ASE light in the output lights is large, as a change in the output level to the main signal light at the time of the input of optical main signal turns OFF is large, the OFF state can be easily detected without being affected by the ASE light.

However, if the ASE light forms a large proportion of the output light, the output power will not go down, and even if the input of optical main signal turns OFF, the detection of the OFF state may not be possible.

Figure 10:
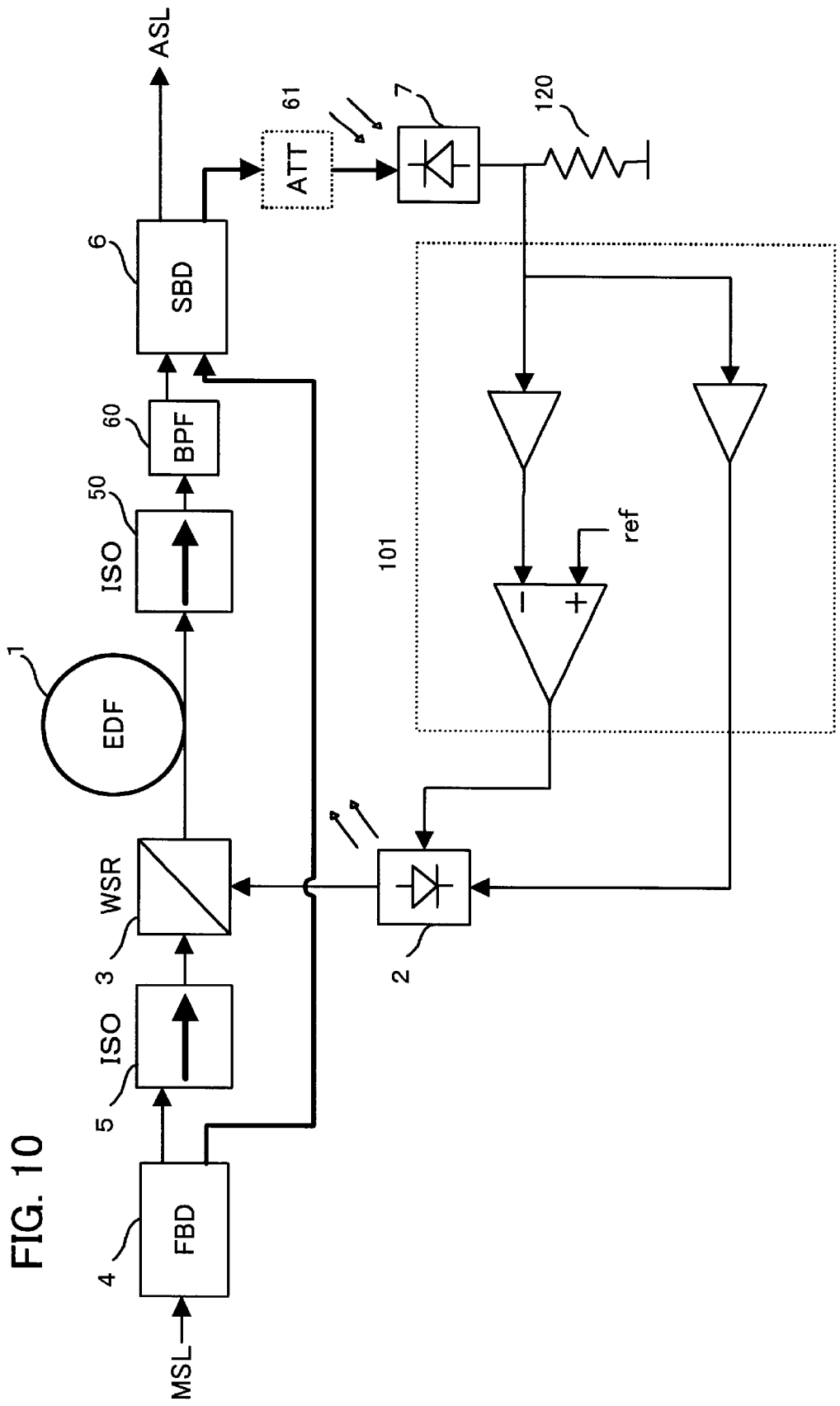
FIG. 10 is a block diagram for an embodiment conforming to the principle-based configuration shown in FIG. 2 to deal with inconveniences caused by the improper magnitude of the proportion formed by the ASE lights.

FIG. 10 shows a block diagram for an embodiment conforming to the principle-based configuration shown in FIG. 2 to deal with the inconvenience caused by such a large proportion formed by the ASE light.

The configuration of the optical amplification control unit 101 is briefly noted. The configuration can be made like the configuration in the embodiment shown in FIG. 4 or FIG. 7. A feature of the configuration shown in FIG. 10 is the point to insert a BPF (Band Pass Filter) 60 in front of the optical receiver element 7, at the front step or rear step of the second branching device 6. (In FIG. 10, at the front step of the branching device 6, the band pass filter 60 is inserted.)

By the insertion of this band pass filter 60, it will be possible to eliminate the ASE component to be inputted to the optical receiver element 7. Therefore, it will be possible to easily detect the OFF state of the input of optical main signal, without being affected by the ASE which was increased by the ALC control.

In addition, in FIG. 10, it is possible to configure by inserting an optical attenuator 61, instead of inserting the band pass filter 60 in front of the optical receiver element 7, so that the output optical power itself of the doped fiber 1 can be attenuated. In such a configuration, in order to make it possible to detect the OFF state of the input without being affected by the ASE, the output power itself must be allowed to attenuate to a level that will not affect the detection of the OFF state of the input of optical main signal.

Further in FIG. 10, it is also possible to use a fiber grating instead of the band pass filter 60.

Here, studies are made on the detection of the OFF state of the input of optical main signal in each embodiment as previously described. In each of the embodiments as described above, the ALC control controls the total power so that the detection level of the optical receiver element 7 to be kept constant.

Figures 11A, 11B:
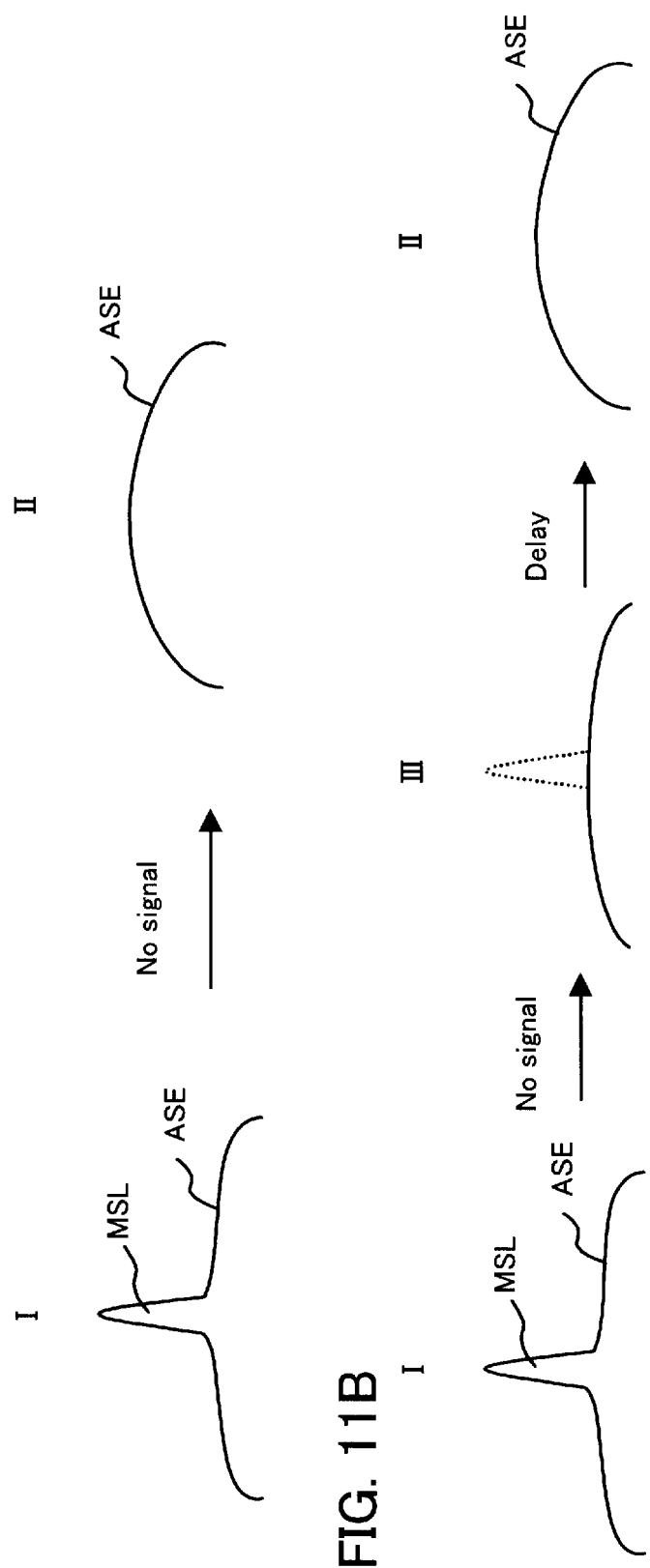
FIGS. 11A & 11B show the relation between the main signal lights and the ASE lights.

Therefore, from FIGS. 11A & 11B showing the relation between the main signal light and the ASE light, and FIGS. 12A & 12B showing the relation of input light and the output timing of the laser diode 2 for excitation light, explanations can be made as follows.

When the input of optical main signal turns OFF (FIG. 12A, a) from the ON state (spectrum I), this OFF state will be immediately detected, and for the purpose of the total power control by the ALC, as shown in FIG. 12A, the LD current (FIG. 12A, b) of the laser diode 2 for excitation light will increase.

Therefore, as shown by the spectrum II in FIG. 11A, the level of the ASE (Amplified Spontaneous Emission) light will be amplified, and as a result, as shown in FIG. 12A, the output detected by the optical receiver element 7 will not be less than the threshold value (FIG. 12A, c), thereby causing the possibility that the OFF state of the input of optical main signal may not be detected.

Figure 13:
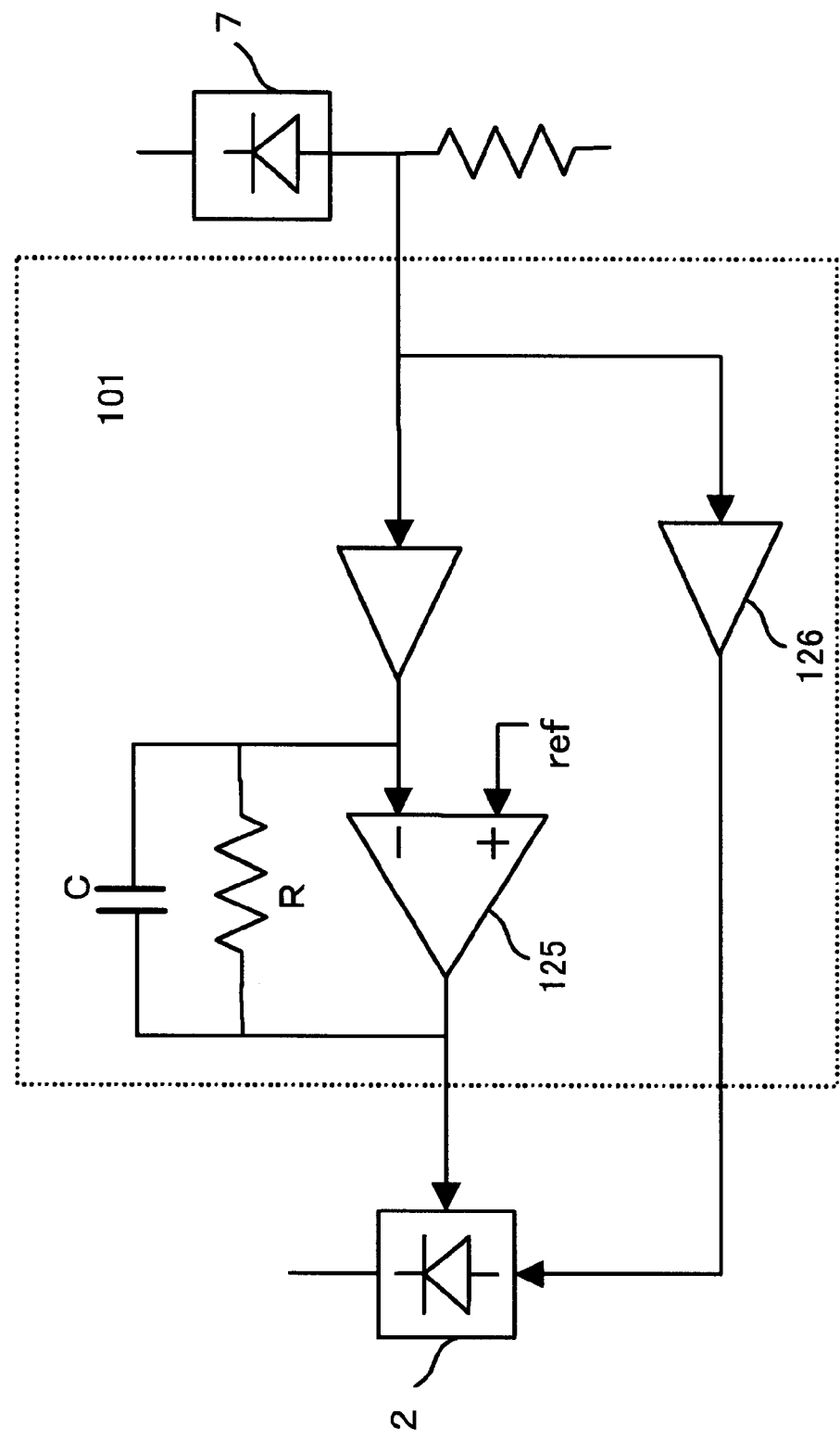
FIG. 13 shows a configuration in which a time constant circuit is provided for an optical amplification control unit 101.

For this purpose, as a countermeasures, it is possible to configure the optical amplification control unit 101 as shown in FIG. 13. In other words, in the configuration shown in FIG. 13, a time constant circuit is inserted between the input and output of a comparative element 125 that compares the detection level with the reference value, by the parallel connection of a capacitor and resistance, so as to delay the control timing of the ALC.

As shown in FIG. 12B, by increasing the time constant of the time constant circuit, the timing of detecting the OFF state of the input can be delayed. Due to this operation, the LD current (FIG. 12B, b) of the laser diode 2 for excitation light will not increase, and, as shown by the spectrum III in FIG. 11B, the detection level by the optical receiver element 7 is the level on which only the main signal light is OFF.

Therefore, as shown in FIG. 12B, c, it is possible to exactly detect the dropping output incident to the OFF state of the main signal light, by the detection before the elapsed time of the time constant set for the time constant circuit by the optical receiver element 7. Moreover, as shown by the spectrum II shown in FIG. 11B, when the time of the time constant has been elapsed, in the same manner as shown in FIG. 11A, the ASE is intensified.

Here, in the embodiment described above, the examples of majorly using the optical amplification fiber 1 as the optical amplifier, however, the principle of the present invention, not limited to these, but can similarly be applied to embodiments using a semiconductor optical amplifier, including a semiconductor laser.

Figure 14:
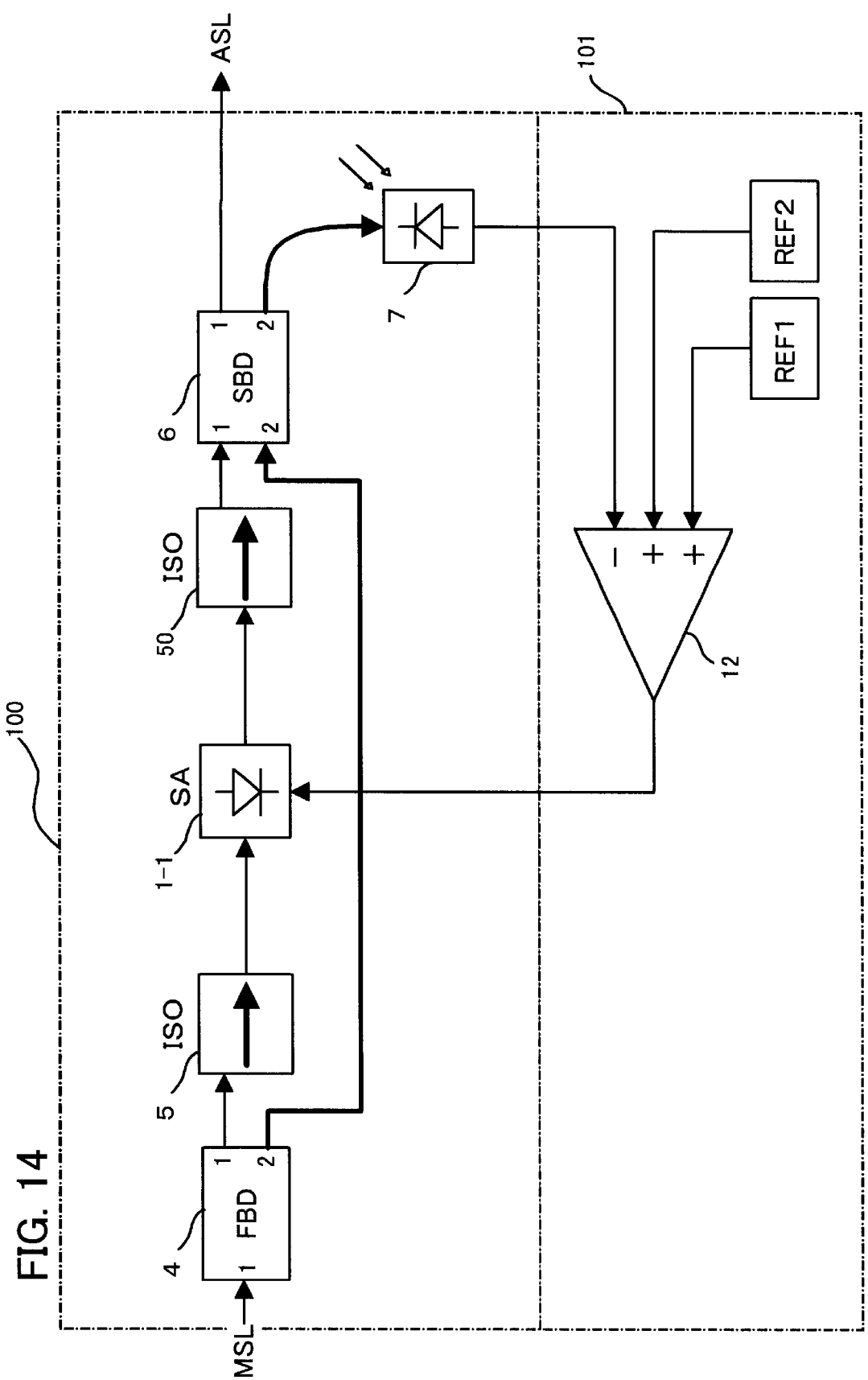
FIG. 14 shows an example of using a semiconductor optical amplifier 1—1 made of a semiconductor laser, as an optical amplifier, in a configuration conforming to the embodiment shown in FIG. 4.

FIG. 14 shows a configuration supporting the embodiment shown in FIG. 4, and it is an example of using a semiconductor optical amplifier 1—1 consisting of a semiconductor laser, instead of an optical amplification fiber 1, as an optical amplifier. In this embodiment, the laser diode 2 for excitation light and the synthesizer 3 shown in FIG. 4 are not needed.

The semiconductor laser constituting the semiconductor optical amplifier 1—1 emits when an electron and a hole are re-combined in the activated layer area, and the light emitted by the re-combination will go and return the activated layer by a feedback action. Because of this reason, emission caused by the re-combination will be promoted, and induced emitted, thereby causing an optical amplifier action.

Moreover, it has a current/optical output characteristic, and an optical output is obtained in an approximate proportion to the injection bias current more than excitation threshold. Further, with the injection bias current supposed to be constant, when the electron and hole are generated by the external input light, the amplified optical output that matches the input light is obtained.

The embodiment shown in FIG. 14, in accordance with such a principle and based on the magnitude of the optical output to be detected by the optical receiver element 7, and the detection of the OFF state of the input light, at the optical amplification control unit 101, with the output of the comparative circuit 12, controls the injection bias current of the semiconductor optical amplifier 1—1, and further controls the ALC control and the laser ray from the optical amplification control unit at the time when the input light OFF to stop oscillating.

For the embodiment using the optical amplification fiber 1 as shown in FIG. 6, like the configuration shown in FIG. 14, a configuration using a semiconductor optical amplifier 1—1 can be employed.

As set forth hereinabove about the embodiment with reference to the drawing, the present invention can reduce the number of optical receiver elements, thereby enabling the peripheral circuits for controlling the optical receiver elements to be omitted. By virtue of this, it is possible to provide a gain block with an optical amplification fiber of simple structure, and an optical amplification system using the amplification block.

What is claimed is:

1. An optical amplification block comprising:
   an optical amplification media for making an optical amplification;
   a first branching device to input signal lights and branch the signal lights into first branched lights and second branched lights, in a predetermined proportion, and input the first branched lights to the optical amplification media; and
   a second branching device to input the output of the optical amplification media and the second branched lights unamplified, the second branching device branching the input lights into third branched lights as optical amplified output and fourth branched lights as monitor lights.

2. The optical amplification block according to claim 1, further comprising removal means to remove ASE contained in optical signals amplified by the optical amplification media from the monitor lights.

3. The optical amplification block according to claim 1, wherein the optical amplification media is an optical amplification fiber to change the optical output level by excitation lights supplied, and the emission of the excitation lights supplied is controlled depending on the level of the monitor lights.

4. The optical amplification block according to claim 1, wherein the optical amplification media is a semiconductor optical amplifier to change the optical output level by an input bias current, and the supply of the input bias current is controlled depending on the level of the monitor lights.

5. An optical amplification system comprising:
   an amplification block according to claim 3; and
   an optical amplification control unit which inputs an optical signal level detected in conformity with the monitor lights in the amplification block, to compare the optical signal level with a first reference potential, the optical amplification control unit, when the optical signal level becomes lower than the first reference potential, stopping the emission of the excitation lights and comparing the optical signal level with a second reference signal to control the magnitude of the power of the excitation light depending on the magnitude of the difference from the second reference signal.

6. The optical amplification system according to claim 5, wherein the optical amplification control unit includes a time constant circuit to compare the optical signal level with the first reference potential to delay the timing of detection at which the optical signal level becomes lower than the first reference potential.

7. An optical amplification system comprising:

an amplification block according to claim 3, and an optical amplification control unit inputting the optical signal level detected in conformity with the monitor lights in the amplification block to compare the optical signal level with a first reference potential to control a magnitude of the excitation light depending on a magnitude of the difference from the first reference potential, the optical amplification control unit providing a control where emission of the excitation light is stopped or permitted when a fall and a rise of the optical signal level to be detected in conformity with the monitor lights becomes lower than or higher than a predetermined potential.

8. The optical amplification system according to claim 7, wherein the optical amplification control unit includes a differentiation circuit to generate pulses for the fall and rise of the optical signal level to be detected.

9. An optical amplification block comprising:

an optical amplification media for making an optical amplification;

a first branching device to input signal lights and feedback branched lights and branch the input lights into first branched lights and second branched lights, unamplified, as monitor lights, in specified proportions, the first branching device inputting the first branched lights to the optical amplification media; and a second branching device to input the output of the optical amplification media and branch the input lights into third branched lights as optical amplified outputs and fourth branched lights as feedback branched lights, in a predetermined proportion.

10. The optical amplification block according to claim 9, further comprising removal means to remove ASE contained in optical signals amplified by the optical amplification media from the monitor lights.

11. The optical amplification block according to claim 9, wherein the optical amplification media is an optical amplification fiber to change the optical output level by excitation lights supplied, and the emission of the excitation lights supplied is controlled depending on the level of the monitor lights.

12. The optical amplification block according to claim 9, wherein the optical amplification media is a semiconductor optical amplifier to change the optical output level by an input bias current, and the supply of the input bias current is controlled depending on the level of the monitor lights.

13. An optical amplification block comprising:

an optical amplification media for making an optical amplification;

a first branching device to input signal lights and branch the signal lights into first branched lights and second branched lights, in a predetermined proportion, and input the first branched lights to the optical amplification media; and a second branching device to input the output of the optical amplification media and the second branched lights, and branches third branched lights as optical amplified output and fourth branched lights as monitor lights, wherein the monitor lights comprise an amount of the second branched lights greater than an amount of the output of the optical amplification media.

* * * * *